US010125835B2

United States Patent
Oshio et al.

(10) Patent No.: US 10,125,835 B2
(45) Date of Patent: Nov. 13, 2018

(54) ELECTRIC PARKING BRAKE DEVICE

(71) Applicant: ADVICS CO., LTD., Kariya-shi, Aichi-ken (JP)

(72) Inventors: Yusuke Oshio, Anjo (JP); Tetsuaki Tsuzuki, Gamagori (JP); Kentaro Yuasa, Obu (JP)

(73) Assignee: ADVICS CO., LTD., Kariya-shi, Aichi-ken (JP)

( * ) Notice: Subject to any disclaimer, the term of this patent is extended or adjusted under 35 U.S.C. 154(b) by 0 days.

(21) Appl. No.: 15/501,931

(22) PCT Filed: Aug. 6, 2015

(86) PCT No.: PCT/JP2015/072396
§ 371 (c)(1),
(2) Date: Feb. 6, 2017

(87) PCT Pub. No.: WO2016/027688
PCT Pub. Date: Feb. 25, 2016

(65) Prior Publication Data
US 2017/0227078 A1 Aug. 10, 2017

(30) Foreign Application Priority Data

Aug. 22, 2014 (JP) ................................. 2014-169232

(51) Int. Cl.
*F16D 65/22* (2006.01)
*B60T 17/18* (2006.01)
(Continued)

(52) U.S. Cl.
CPC ................ *F16D 65/22* (2013.01); *B60T 8/00* (2013.01); *B60T 17/18* (2013.01); *F16D 51/18* (2013.01);
(Continued)

(58) Field of Classification Search
CPC .. F16D 65/22; F16D 2125/40; F16D 2125/42; F16D 2121/26; B60T 17/18; B60T 17/22; B60T 17/221
See application file for complete search history.

(56) References Cited

U.S. PATENT DOCUMENTS 5,462,502 A * 10/1995 Lin ........................... B60T 7/06
477/186
9,555,779 B2 * 1/2017 Oshio ..................... B60T 7/107
(Continued)

FOREIGN PATENT DOCUMENTS

JP H11-105680 4/1999
JP 2002-81475 A 3/2002
(Continued)

OTHER PUBLICATIONS

International Search Report (PCT/ISA/210) dated Oct. 13, 2015, by the Japanese Patent Office as the International Searching Authority for International Application No. PCT/JP2015/072396.
(Continued)

*Primary Examiner* — Thomas J Williams
(74) *Attorney, Agent, or Firm* — Buchanan Ingersoll & Rooney PC (57) ABSTRACT

Electric parking brake devices are configured such that a parking lever is driven by an electric actuator. The electric actuator is provided with: an electric motor drivable in a forward/reverse direction and operationally controlled by a motor control unit according to rotational loads; a conversion mechanism capable of converting a rotational motion into a linear motion, moving the parking lever from a return position toward an operating position through forward rotation of the electric motor, and moving the parking lever from the operating position toward the return position through the reverse rotation of the electric motor; and a load applying mechanism (a stopper and a disc spring assembly) for
(Continued)

applying a predetermined rotational load to the electric motor by driving a constituent member of the conversion mechanism after the parking lever is moved from the operating position to the return position through the reverse rotation of the electric motor.

5 Claims, 10 Drawing Sheets (51) Int. Cl.
*B60T 8/00* (2006.01)
*F16D 66/00* (2006.01)
*F16D 51/18* (2006.01)
*F16D 121/26* (2012.01)
*F16D 125/40* (2012.01)
*F16D 121/14* (2012.01)
*F16D 121/24* (2012.01)

(52) U.S. Cl.
CPC .......... *F16D 66/00* (2013.01); *F16D 2121/14* (2013.01); *F16D 2121/24* (2013.01); *F16D 2121/26* (2013.01); *F16D 2125/40* (2013.01)

(56) References Cited

U.S. PATENT DOCUMENTS

| | | | |
|---|---|---|---|
| 9,566,956 B2 * | 2/2017 | Koga | F16D 65/09 |
| 2002/0027387 A1 | 3/2002 | Kubota | |
| 2008/0185235 A1 | 8/2008 | Suzuki | |
| 2010/0206677 A1 * | 8/2010 | Shiraki | B60T 13/741 188/325 |
| 2011/0295478 A1 * | 12/2011 | Jeon | B60T 7/107 701/70 |
| 2012/0193178 A1 * | 8/2012 | Yamada | F16D 51/20 188/162 |
| 2012/0247895 A1 | 10/2012 | Tsurumi et al. | |
| 2014/0020997 A1 * | 1/2014 | Bach | F16D 51/16 188/325 |
| 2017/0106848 A1 * | 4/2017 | Ritter | F16D 65/18 |

FOREIGN PATENT DOCUMENTS

| | | |
|---|---|---|
| JP | 2008-25873 A | 2/2008 |
| JP | 2012-211647 A | 11/2012 |

OTHER PUBLICATIONS

Written Opinion (PCT/ISA/237) dated Oct. 13, 2015, by the Japanese Patent Office as the International Searching Authority for International Application No. PCT/JP2015/072396.

Extended European Search Report dated Mar. 28, 2018 issued by the European Patent Office in corresponding European Patent Application No. 15833703.0 (7 pages).

\* cited by examiner

101: LOCK CONTROL PROCESS ROUTINE
102: START MOTOR FORWARD ROTATIONAL DRIVE
103: ELAPSED TIME Tup
104: ELAPSED TIME T $\geqq$ PREDETERMINED VALUE T1?
105: CURRENT VALUE A $\geqq$ TARGET CURRENT VALUE A1?
106: RESET Ta
107: CONDITION ESTABLISHMENT DURATION Taup
108: CONDITION ESTABLISHMENT DURATION Ta $\geqq$ PREDETERMINED VALUE T2?
109: STOP MOTOR FORWARD ROTATIONAL DRIVE
110: STORE LOCK STATE
111: RESET T, Ta
112: RETURN

[Fig.7]

201: RELEASE CONTROL PROCESS ROUTINE
202: START MOTOR REVERSELY ROTATIONAL DRIVE
203: Tup
204: $T \geqq T3$
205: $A \geqq A2$
206: Tup
207: RESET Tb
208: $T \geqq T5$
210: IN-ABNORMAL-STATE PROCESS
220: IN-NORMAL-STATE PROCESS

[Fig.8]

211: IN-ABNORMAL-STATE PROCESS ROUTINE
212: Tbup
213: Tb ≧ T4
214: STOP MOTOR REVERSELY ROTATIONAL DRIVE
215: ABNORMALITY WARNING
216: RESET T, Tb
217: RETURN

[Fig.9]

221: IN-NORMAL-STATE PROCESS ROUTINE
222: CALCULATE Ao
223: A ≧ (Ao+A3)
224: Tcup
225: Tc ≧ T6
226: STOP MOTOR REVERSELY ROTATIONAL DRIVE
227: STORE RELEASE STATE, RESET T, Tc
228: RETURN
229: RESET Tc

[Fig.10]

ELECTRIC PARKING BRAKE DEVICE

TECHNICAL FIELD

The present invention relates to an electric parking brake device and, in particular, an electric parking brake device configured such that a parking lever in a drum brake is driven from a return position to an operating position by forward drive of an electric actuator to drive a brake shoe from a return position to an operating position and the parking lever is driven from the operating position to the return position by reverse drive of the electric actuator to drive the brake shoe from the operating position to the return position.

BACKGROUND ART

The electric parking brake device of this type is described in, for example, the following Patent Literature 1. A parking brake switch is actuated and operated to make it possible to drive an electric actuator forward and to make it possible to drive a parking lever from a return position to an operating position (more specifically, to set a parking brake in an operating state (lock state)). When the parking brake switch is operated to be released to make it possible to reversely drive the electric actuator and to make it possible to drive the parking lever from the operating position to the return position (more specifically, to set the parking brake in a release state (release state)).

CITATION LIST

Patent Literature

Patent Literature 1: Japanese Unexamined Patent Publication No. H11-105680

In the electric parking brake device described in the Patent Literature 1, an electric motor (motor) included in the electric actuator is rotated forward to make it possible to drive the electric actuator forward, and when a predetermined current or more flows in the forward-rotating electric motor, the electric motor is stopped to make it possible to always obtain a predetermined parking brake force. The Patent Literature 1 also describes that the electric motor (motor) included in the electric actuator is reversely rotated to make it possible to reversely drive the electric actuator, and, when a current flowing in the reversely rotating electric motor is a no-load current, a power supply to the electric motor is disconnected.

SUMMARY OF INVENTION

In the electric parking brake device described in the Patent Literature 1, depending on a current value flowing in the electric motor, an operation/stop state of the electric motor can be advantageously controlled (a sensor for electrically detecting the state of a parking lever is advantageously unnecessary). However, the brake shoe of the drum brake generally includes a return spring biasing the brake shoe toward the return position. For this reason, when the parking brake is released, the reverse drive of the electric actuator is assisted by the return spring.

Thus, a timing at which a current flowing in the reverse-rotating electric motor becomes a no-load current may be disadvantageously different from a timing at which the parking lever returns to the return position. For this reason, when the parking brake is released, the parking lever may be incompletely returned or excessively returned disadvantageously. When the parking lever is incompletely returned, for example, the brake is disadvantageously dragged. When the parking lever is excessively returned, for example, a drawback such as a delay of response in the next operation of the parking brake may occur.

The present invention has been made to solve the above problem (to prevent a parking lever from being incompletely returned or excessively returned in a release state of the parking brake), and has as its object to provide an electric parking brake device configured such that a parking lever in a drum brake is driven from a return position to an operating position by forward drive of an electric actuator to drive a brake shoe from a return position to an operating position and the parking lever is driven from the operating position to the return position by reverse drive of the electric actuator to drive the brake shoe from the operating position to the return position, wherein the electric actuator includes an electric motor which can be rotationally driven forward/reversely and the operation of which can be controlled by a motor control unit depending on a rotational load, a conversion mechanism which can convert rotational motion into linear motion, can move the parking lever from the return position to the operating position in a forward drive state in which the electric motor rotates forward, and can move the parking lever from the operating position to the return position in a reverse drive state in which the electric motor reversely rotates, and a load applying mechanism drives a constituent member of the conversion mechanism after the parking lever moves from the operating position to the return position by reverse rotation of the electric motor to apply a rotational load increasing depending on a drive amount of the constituent member to the electric motor, and the motor control unit includes a calculation unit which calculates a rotational load determination value to determine whether a rotational load applied to the electric motor by the load applying mechanism when the electric motor reversely rotationally drives is a set value or more on the basis of a current supplied to the electric motor, and a reversely rotational drive stop unit which stops the reversely rotational drive of the electric motor when the rotational load determination value is a reference value or more a set time after the reversely rotational drive of the electric motor is started.

In the electric parking brake device according to the present invention, the motor control unit can obtain a parking brake operation such that the electric motor is rotated forward by an actuating operation of the parking brake switch, and the forward-rotating electric motor is stopped by a current value obtained when a rotational load acting on the forward-rotating electric motor becomes a set value. At this time, when the parking brake switch is actuated and operated, the electric motor rotates forward, and the parking lever at the return position is driven from the return position to the operating position by forward drive of the electric actuator to drive a brake shoe from the return position to the operating position. At this time, since the device is set such that the forward-rotating electric motor is stopped by a current value (target current value) obtained when the rotational load (load obtained when the brake shoe moves to the operating position and is brought into press contact with the brake drum) acting on the forward rotating electric motor becomes the set value, predetermined parking brake force can be always obtained.

The motor control unit is set such that the electric motor is reversely rotated by a releasing operation of the parking brake switch, and the reversely rotating electric motor is stopped by a current value obtained when a rotational load acting on the reversely rotating electric motor becomes a set value, so as to make it possible to release the parking brake. At this time, when the parking brake switch is released, the electric motor reversely rotates, and the parking lever at the operating position is driven from the operating position to the return position by reverse drive of the electric actuator to drive the brake shoe from the operating position to the return position. At this time, since the device is set such that the reversely rotating electric motor is stopped by a current value obtained when the rotational load (load obtained by the load applying mechanism) acting on the reversely rotating electric motor becomes the set value, the parking lever can always be stopped in a state in which the parking lever is always returned to the predetermined return position.

Thus, in the electric parking brake device according to the present invention, the parking lever can be prevented from being incompletely returned or excessively returned when the parking brake is released. In this manner, a drawback (for example, drag of the brake) caused by incomplete return of the parking lever can be prevented, and a drawback caused by excessive return of the parking lever (for example, delay of response in the next operation of the parking brake) can be prevented.

In the electric parking brake device according to the present invention, the operation/stop of the electric motor can be advantageously controlled by a current value supplied to the electric motor (a sensor for electrically detecting the state of the parking lever is advantageously unnecessary), and the motor control unit can be simply configured at low costs. Since the motor control unit includes the calculation unit and the reversely rotational drive stop unit, the reversely rotational drive of the electric motor can be accurately stopped, and a rotational load required by the load applying mechanism can be set to be small. As a result, the load applying mechanism can be miniaturized and manufactured at low costs.

In execution of the present invention described above, the rotational load determination value is a current value supplied to the electric motor, and a sum of a no-load current value detected in a reversely rotational drive state of the electric motor and a preset predetermined current value can also be defined as the reference value.

In this case, a sum of the no-load current value and the preset predetermined current value is defined as the reference value, and the no-load current value serves as a part of the reference value. For this reason, a fluctuation in performance caused by a manufacturing error or the like in the conversion mechanism or the load applying mechanism can be excluded. Thus, determination accuracy when the reversely rotational drive of the electric motor is stopped can be improved, and a rotational load required by the load applying mechanism can be reduced. As a result, the load applying mechanism can be miniaturized and manufactured at low costs.

In execution of the present invention described above, the rotational load determination value is a differential value of a current value supplied to the electric motor, and the preset predetermined value can also be defined as the reference value.

In this case, since the rotational load determination value is the differential value of the current value supplied to the electric motor, in comparison with the case in which the sum of the no-load current value detected in the reversely rotational drive state of the electric motor and the preset predetermined current value is defined as the reference value, a stop timing can be more quickly determined. For this reason, determination accuracy when the reversely rotational drive of the electric motor can be improved, and the load applying mechanism can be further miniaturized and manufactured at low costs.

In each of the cases of the present invention, the motor control unit can also include an abnormal-state reversely rotational drive stop unit which, when it is determined that the rotational load determination value is a reference value or more within the set time except for an operation initial time zone in which a current supplied to the electric motor is unstable from the start of the reversely rotational drive of the electric motor, stops the reversely rotational drive of the electric motor, and an abnormality notification unit which notifies of abnormality. In this case, the abnormal electric actuator in the device can be rapidly detected to stop the abnormal operation and to make it possible to notify of the abnormal operation.

DESCRIPTION OF EMBODIMENTS

Embodiments of the present invention will be described below with reference to the accompanying drawings. FIG. 1 to FIG. 4 show an embodiment of an electric parking brake device according to the present invention. The electric parking brake device according to the embodiment includes a drum brake 10 having a parking brake mechanism and an electric actuator 20 driving the parking brake mechanism.

Figure 1:
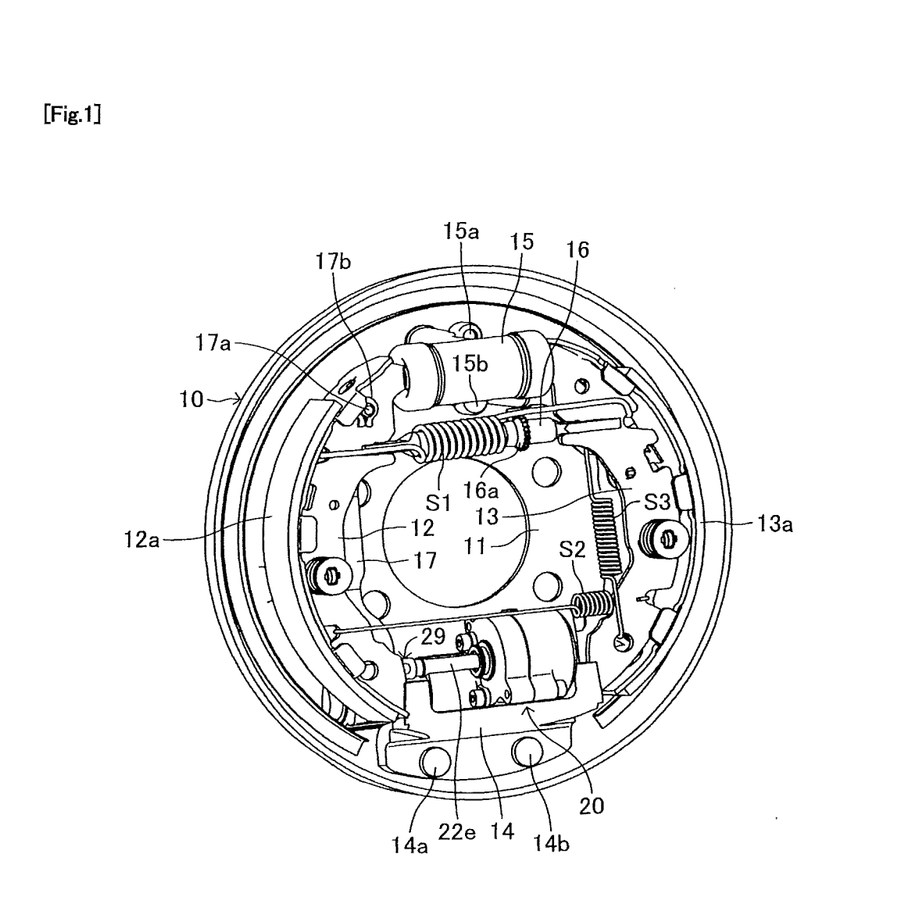
FIG. 1 is a perspective view showing an embodiment of an electric parking brake device according to the present invention.
Figure 2:
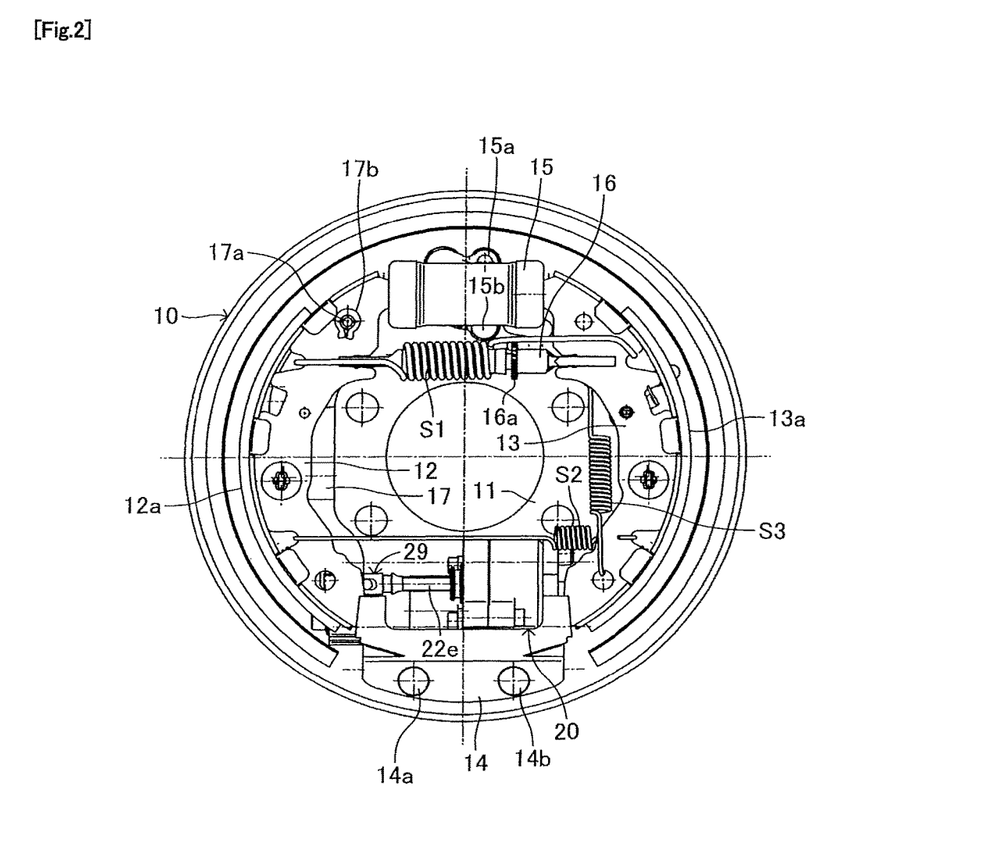
FIG. 2 is a front view of the electric parking brake device shown in FIG. 1.

The drum brake 10, as shown in FIG. 1 and FIG. 2, includes a disk-like back plate 11, one pair of brake shoes 12 and 13 assembled on the back plate 11, an anchor block 14, a wheel cylinder 15, and the like. The back plate 11 is configured to be fixed to an attaching part (not shown) on a vehicle body side.

The brake shoes 12 and 13 are assembled on the back plate 11 such that the brake shoes 12 and 13 can move in a specific direction (direction along a plate plane) with reference to the back plate 11, and integrally include arc-shaped linings 12a and 13a pressed against a brake drum (not shown) in a brake operating state, respectively. A coupling member 16 with adjustment mechanism and return springs S1 and S2 are assembled between the brake shoes 12 and 13.

The brake shoe 12 on the left in FIG. 1 and FIG. 2 is configured to be engaged with a left piston (not shown) of the wheel cylinder 15 at an upper end of the brake shoe 12, engaged with the anchor block 14 at the lower end, and pressed and spread to the left toward the brake drum (not shown) in a brake operation state. A parking lever 17 is swingably assembled on the brake shoe 12.

On the other hand, the brake shoe 13 on the right in FIG. 1 and FIG. 2 is configured to be engaged with a right piston (not shown) of the wheel cylinder 15 at an upper end of the brake shoe 13, engaged with the anchor block 14 at the lower end, and pressed and spread to the right toward the brake drum (not shown) in a brake operation state. A return spring S3 (the spring S3 has an upper end locked on the back plate 11 and a lower end locked on the brake shoe 13) is assembled on the brake shoe 13.

The anchor block 14 is fixed to a lower part of the back plate 11 in the drawing by using one pair of fixtures 14a and 14b. The wheel cylinder 15 is fixed to an upper part of the back plate 11 in the drawing by using one pair of fixtures 15a and 15b. The wheel cylinder 15 includes one pair of pistons (not shown) which come away from the left and right sides in the operation of the brake to open the left and right brake shoes 12 and 13, the wheel cylinder 15 housing the pair of pistons therein.

A coupling member 16 is tiltably engaged with an upper part of the brake shoe 12 at a left-end part and tiltably engaged with an upper part of the parking lever 17, and tiltably engaged with an upper part of the brake shoe 13 at a right-end part. The coupling member 16 is configured to have a length which can be automatically adjusted (increasable) by a known adjustment mechanism 16a depending on amounts of abrasion of the linings 12a and 13a.

Figure 3:
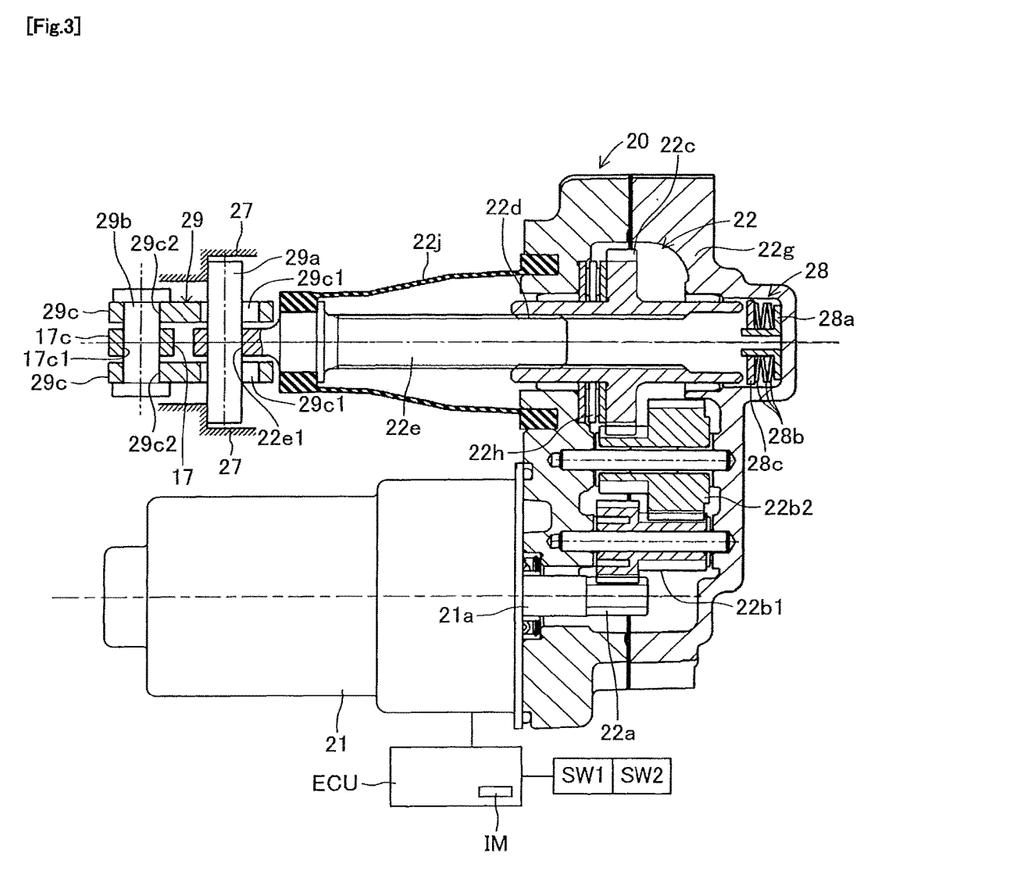
FIG. 3 is a sectional view showing a configuration of an electric actuator in the electric parking brake device shown in FIG. 1 and FIG. 2, and shows a cross-sectional plan view of a coupling part between a parking lever and a rod along 3-3 line in FIG. 4.

The parking lever 17 is disposed along the left brake shoe 12 in the drawing and tiltably (rotatably) coupled to the brake shoe 12 at the upper-end part by using a pin 17a and a clip 17b. The parking lever 17 is configured such that the parking lever 17, at the lower end, as shown in FIG. 3, is engaged with a coupling mechanism 29 on the electric actuator 20 and driven in the left-right direction by the coupling mechanism 29 (rotatably driven around the pin 17a).

The electric actuator 20, as shown in FIG. 1 and FIG. 2, is disposed in the drum brake 10. The electric actuator 20, as shown in FIG. 3, includes an electric motor 21, a conversion mechanism 22, and a stopper 27 and a disk spring assembly 28 which function as a load applying mechanism, and also includes the coupling mechanism 29. The electric motor 21 can be rotationally driven forward/reversely, and is configured to be operated with a motor control unit (electric control device) ECU depending on a current value changing depending on a rotational load. The current value depending on the rotational load can be detected by a current monitor IM included in the motor control unit (electric control device) ECU.

The conversion mechanism 22 can convert rotational motion of the electric motor 21 into linear motion of a rod (screw shaft) 22e (swinging operation of the parking lever 17 through the coupling mechanism 29), can axially move the rod 22e from a return position (position in FIG. 3) to an operating position (position on the right of the position in FIG. 3 by a predetermined length) in a forward drive state in which the electric motor 21 rotates forward, and can axially move the rod 22e from the operating position to the return position in a reverse drive state in which the electric motor 21 reversely rotates.

The conversion mechanism 22 includes a pinion 22a integrally disposed on a rotating shaft 21a of the electric motor 21, a first intermediate gear 22b1 and a second intermediate gear 22b2 which are rotationally driven with the pinion 22a, an output gear 22c rotationally driven with the second intermediate gear 22b2, a screw mechanism 22d disposed at the center (center of axis) of the output gear 22c, and the rod 22e coupled to the output gear 22c through the screw mechanism 22d. The first intermediate gear 22b1 and the second intermediate gear 22b2 decrease rotation of the rotating shaft 21a to transmit the rotation to the output gear 22c.

The first intermediate gear 22b1, the second intermediate gear 22b2, and the output gear 22c are rotatably assembled in a housing 22g. A thrust bearing 22h which receives reaction force (force to the left in FIG. 3) from the parking lever 17 is assembled between the output gear 22c and the housing 22g. The output gear 22c is configured to be able to move in an axial direction with reference to the housing 22g. The electric motor 21 and the housing 22g are fixed to the back plate 11 by using a fixture (not shown).

The screw mechanism 22d includes a female screw part formed at the center (center of axis) of the output gear 22c and a male screw part formed from an intermediate part of the rod 22e to the right end thereof, and the female screw part and the male screw part are meshed with each other. In the screw mechanism 22d, when axial movement (movement to the left in the drawing) of the output gear 22c is regulated, rotation (rotational motion) of the output gear 22c is converted into axial movement (linear motion) of the rod 22e. When axial movement (movement to the left in the drawing) of the rod 22e is regulated by the stopper 27, rotation (rotational motion) of the output gear 22c is converted into axial movement of the output gear 22c.

In the screw mechanism 22d, leads of the female screw part and the male screw parts are arbitrarily set, and the output gear 22c is set not to be rotated by reaction force (axial force) from the parking lever 17. The male screw part formed on the rod 22e is covered and protected with a boot 22j disposed between the distal-end part (left-end part) of the rod 22e and the housing 22g. The boot 22j is configured to extend and contract with the axial movement of the rod 22e.

The stopper 27 and the disk spring assembly 28 which function as the load applying mechanism are designed to function after the parking lever 17 moves from the operating position to the return position, and the stopper 27 is fixed to the back plate 11 by using a fixture (not shown). The stopper 27, after the parking lever 17 moves from the operating position to the return position, as shown FIG. 3, is engaged with a first coupling pin 29a of the coupling mechanism 29 to regulate axial movement of the rod 22e in a return direction (to the left in the drawing).

By reverse rotation of the output gear 22c with reverse rotation of the electric motor 21, after the parking lever 17 moves from the operating position to the return position, in a state in which the first coupling pin 29a is engaged with the stopper 27 to regulate the axial movement of the rod 22e with the stopper 27, when the output gear 22c moves from the return position in an operating direction (to the right in the drawing) in FIG. 3 with the reverse rotation of the output gear 22c, the disk spring assembly 28 is engaged with the right end of the output gear 22c to elastically regulate the axial movement (movement to the right) of the output gear 22c so as to apply a rotational load to the output gear 22c. The rotational load described above increases depending on a drive amount (axial movement) of the output gear 22c, and the rotational load applied to the electric motor 21 increases accordingly.

The disk spring assembly 28, in the housing 22g, is disposed coaxially with the output gear 22c between the housing 22g and the right end of the output gear 22c. The disk spring assembly 28 includes a holder 28a, three disk springs 28b, and a thrust plate 28c. The holder 28a is to movably support the three disk springs 28b and the thrust plate 28c in a small-diameter cylindrical part, is disposed coaxially with the output gear 22c, and is fixed to the housing 22g in a large-diameter part.

The three disk springs 28b are disposed between the large-diameter part of the holder 28a and the thrust plate 28c alternatively as shown in the drawing (such that the large-diameter parts contact with each other and the small-diameter parts contact with each other), and are almost freely disposed in the illustrated state. The thrust plate 28c is disposed between the disk spring 28b at the left end in the drawing and the right end of the output gear 22c, and can rotatably bear the right end of the output gear 22c. The thrust plate 28c, at the position in FIG. 3, is fixed to the small-diameter cylindrical part of the holder 28a not to be removed therefrom (not to move to the left).

Figure 4:
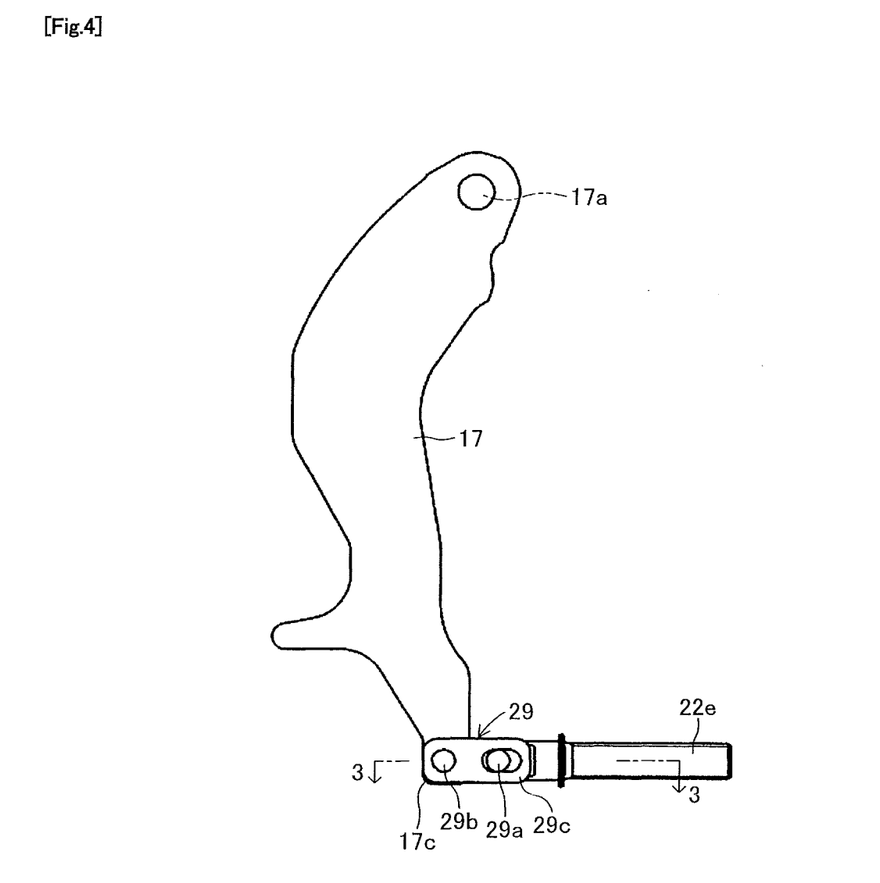
FIG. 4 is a front view showing the parking lever and the rod shown in FIG. 3 and a coupling mechanism coupling the parking lever and the rod.

The coupling mechanism 29, as shown in FIGS. 3 and 4, includes the first coupling pin 29a, a second coupling pin 29b, and one pair of coupling plates (coupling members) 29c. The first coupling pin 29a is assembled on a distal end (end part) of the rod 22e, orthogonal to the rod 22e, and disposed in parallel with the pin (support shaft) 17a of the parking lever 17. An intermediate part of the first coupling pin 29a is integrally fitted and fixed to an attaching hole 22e1 formed in the distal end (end part) of the rod 22e. Both the end parts of the first coupling pin 29a are assembled on first hole parts 29c1 each having an oval shape and formed in the coupling plates 29c such that both the end parts can relatively rotate and move in a long-diameter direction (left-right direction in FIG. 3 and FIG. 4). When the rod 22e returns and moves to the return position, as shown in FIG. 3, both the end parts of the first coupling pin 29a are set to be able to contact with the stopper 27.

The second coupling pin 29b is assembled on a swinging end part 17c of the parking lever 17 and disposed in parallel with the first coupling pin 29a. The second coupling pin 29b is relatively rotatably assembled on a circular assembling hole 17c1 formed in the swinging end part 17c at the intermediate part and relatively rotatably assembled on circular second hole parts 29c2 formed in coupling plates 29c at both the end parts. The second coupling pin 29b has both ends each having a diameter larger than that of the intermediate part to prevent the second coupling pin 29b from being removed.

Each of the coupling plates 29c can rotate in a first hole part 29c1 assembled in the first coupling pin 29a in the circumferential direction of the first coupling pin 29a with reference to the end part of the rod 22e, can rotate in the second hole part 29c2 assembled in the second coupling pin 29b in the circumferential direction of the second coupling pin 29c2 with reference to the parking lever 17, and couples the first coupling pin 29a and the second coupling pin 29b to each other.

In the configuration, on the parking lever 17 and the rod 22e coupled by the coupling mechanism 29, a swinging surface of the parking lever 17 and an axial line of the rod 22e are disposed on the same plane. For this reason, in the embodiment, driving force of the electric actuator 20 can be smoothly transmitted to the swinging end part 17c of the parking lever 17.

The motor control unit (electric control device) ECU, for example, has a function of stopping an operation (forward rotational drive) of the electric motor 21 when a rotational load reaches a set value (obtained by moving the parking lever 17 to the operating position) in a forward rotational drive state of the electric motor 21, and a function of stopping an operation (reversely rotational drive) of the electric motor 21 when the rotational load reaches a predetermined value in a reversely rotational drive state of the electric motor 21.

Figure 5:
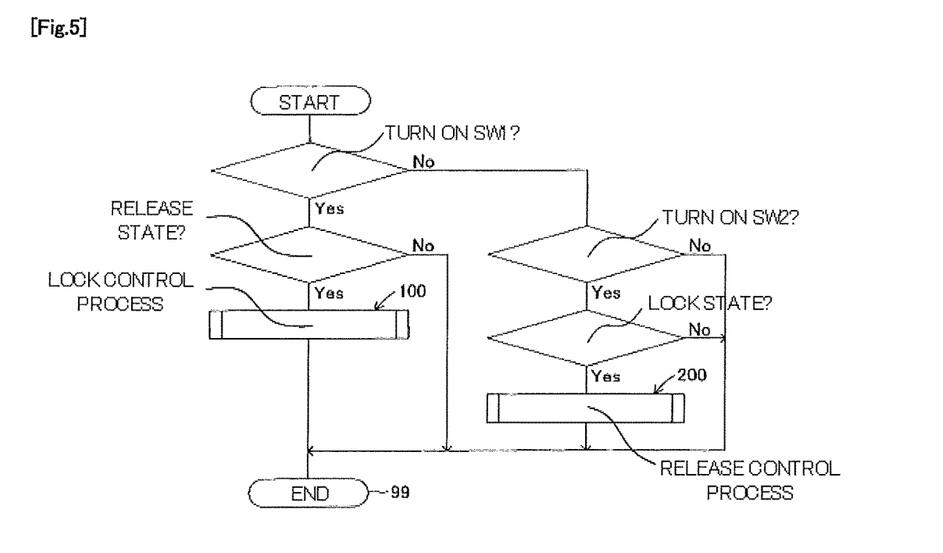
FIG. 5 is a flow chart showing a main routine executed by an electric control device shown in FIG. 3.

The motor control unit (electric control device) ECU is configured such that the motor control device ECU is also connected to a parking lock switch SW1 and a parking release switch SW2 (when any one of the switches is turned on, the other is turned off) which are disposed in the driver seat of the vehicle (see FIG. 3), and, as shown in FIG. 5, when the parking lock switch SW1 is turned on in a state in which a parking brake release state (release state) is stored, a lock control process in step 100 and an end process in step 99 are executed to end the program. When the parking release switch SW2 is turned on in a state in which a parking brake operating state (lock state) is stored, a release control process in step 200 and the end process in step 99 are executed to end the program. The release state is configured to be stored when the reversely rotational drive of the electric motor 21 is normally completed, and the lock state is configured to be stored when the forward rotational drive of the electric motor 21 is normally completed.

Figure 6:
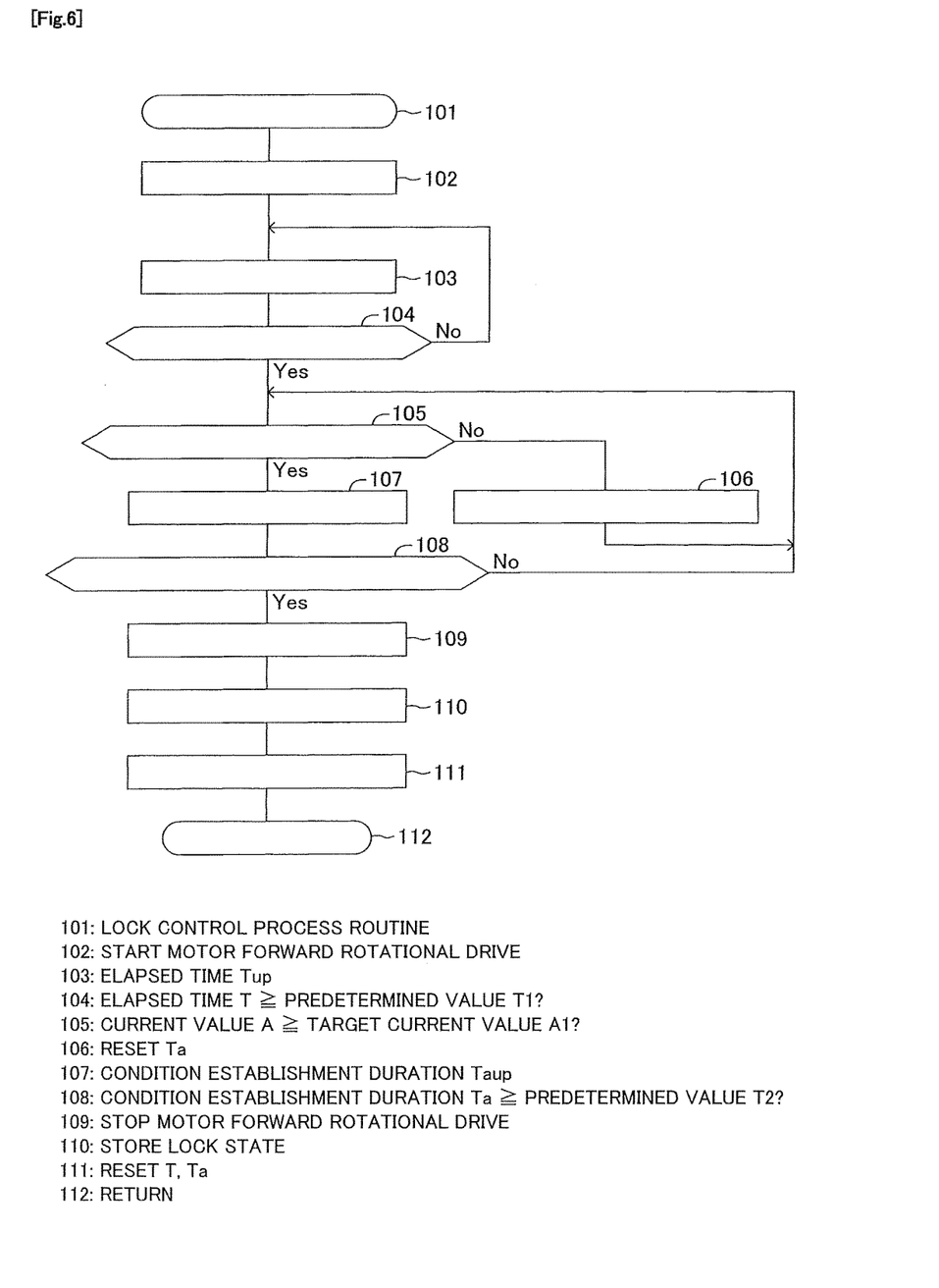
FIG. 6 is a flow chart showing a sub-routine executed in a lock control process shown in FIG. 5.

When the motor control unit (electric control device) ECU executes the lock control process in step 100 in FIG. 5, a lock control process routine in FIG. 6 is executed. In the lock control process routine in FIG. 6, the process is started in step 101, forward rotational drive of the electric motor 21 is started in step 102, and an elapsed time T is counted up (Tup) in step 103. In step 104, it is determined whether the elapsed time T is a predetermined value T1 or longer. The predetermined value T1 corresponds to a time required until a current supplied to the electric motor 21 at the beginning of the forward rotational drive of the electric motor 21 becomes stable, and steps 103 and 104 are repeatedly executed until the elapsed time T reaches the predetermined value T1.

In this manner, when the elapsed time T reaches the predetermined value T1, step 105 is executed to determines whether a current value A (This is calculated on the basis of an output from the current monitor IM.) supplied to the electric motor 21 is a target current value A1 or more. The target current value A1 is obtained when the parking lever 17 moves from the return position to the operating position to make a rotational load (load obtained when the brake shoes 12 and 13 move to the operating positions to bring the linings 12a and 13a into press contact with the brake drum) obtained by the forward rotational drive of the electric motor 21 becomes a set value, and steps 105 and 106 are repeatedly executed until the current value A reaches the target current value A1. In step 106, a condition establishment duration Ta is reset.

When the current value A reaches the target current value A1, steps 107 and 108 are executed to determine whether the condition establishment duration Ta is a predetermined value T2 or more. The predetermined value T2 is to determine a stop timing of the electric motor 21, and is arbitrarily set. Steps 105, 107, and 108 are repeatedly executed until the condition establishment duration Ta reaches the predetermined value T2. When the condition establishment duration Ta reaches the predetermined value T2, "Yes" is determined in step 108, steps 109 to 112 are executed to return the ECU to the main routine in FIG. 5. The forward rotational drive of the electric motor 21 is stopped in step 109, the lock state is stored in step 110, and the elapsed time T and the condition establishment duration Ta are reset in step 111. In step 112, the return process is performed to end the program in step 99 in FIG. 5.

Figure 7:
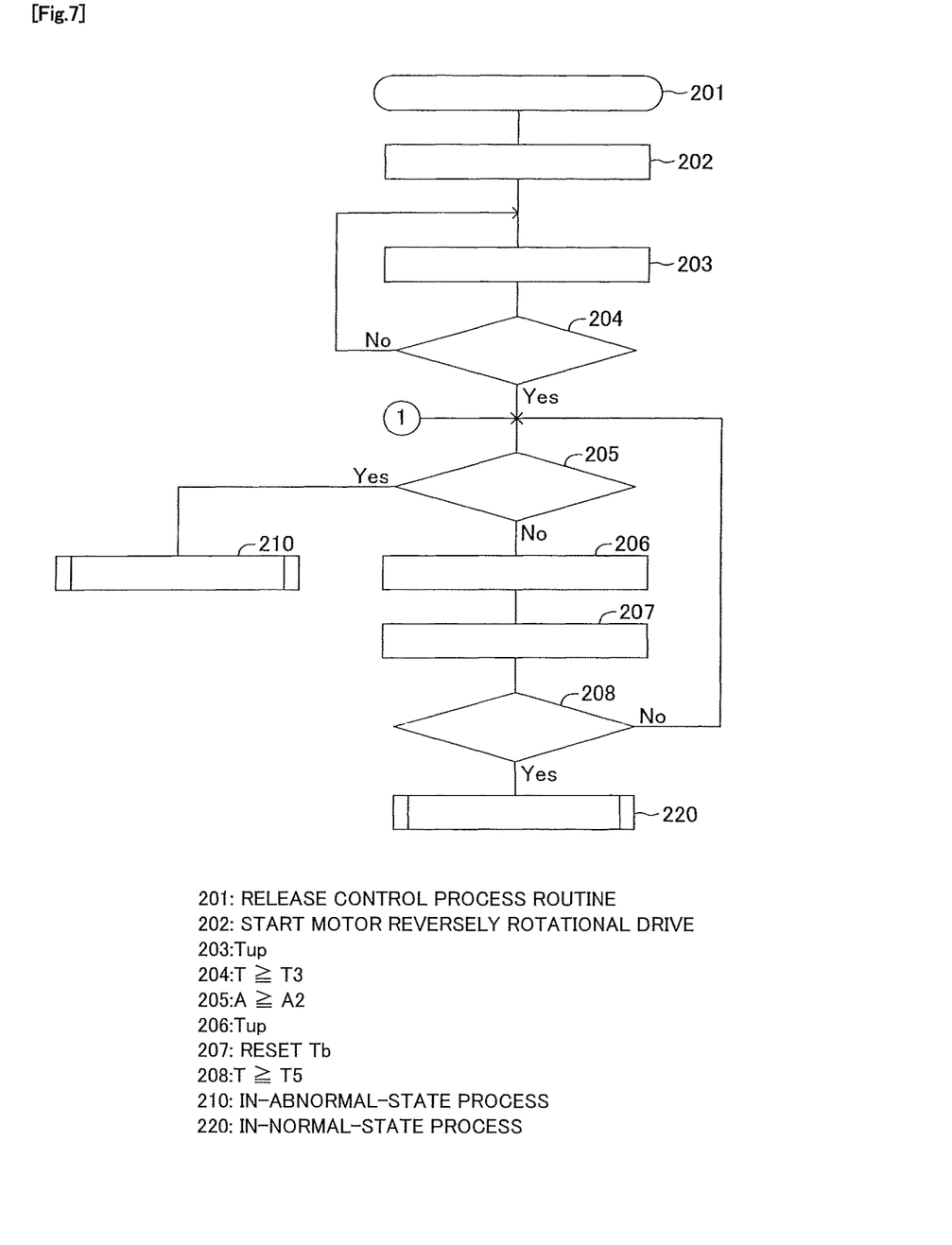
FIG. 7 is a flow chart showing a sub-routine executed in a release control process shown in FIG. 5.

On the other hand, when the motor control unit (electric control device) ECU executes the release control process in step 200 in FIG. 5, a release control process routine in FIG. 7 is executed. In the release control process routine in FIG. 7, the process is started in step 201, reversely rotational drive of the electric motor 21 is started in step 202, and the elapsed time T is counted up in step 203. In step 204, it is determined whether the elapsed time T is a predetermined value T3 or longer. The predetermined value T3 corresponds to a time required until a current supplied to the electric motor 21 at the beginning of the reversely rotational drive of the electric motor 21 becomes stable (see T3 in FIG. 10), and steps 203 and 204 are repeatedly executed until the elapsed time T reaches the predetermined value T3.

In this manner, when the elapsed time T reaches the predetermined value T3, step 205 is executed to determine whether the current value A supplied to the electric motor 21 is an abnormality determination current value A2 or more. The abnormality determination current value A2, for example, is obtained when rotational load obtained by the reversely rotational drive of the electric motor 21 is an abnormal value (see a virtual line and A2 in FIG. 10) when the parking lever 17 moves from the operating position to the return position (for example, an abnormally high rotational resistance is generated on the screw mechanism 22d of the conversion mechanism 22). At this time, "Yes" is determined in step 205 to execute an in-abnormal-state process in step 210.

Figure 8:
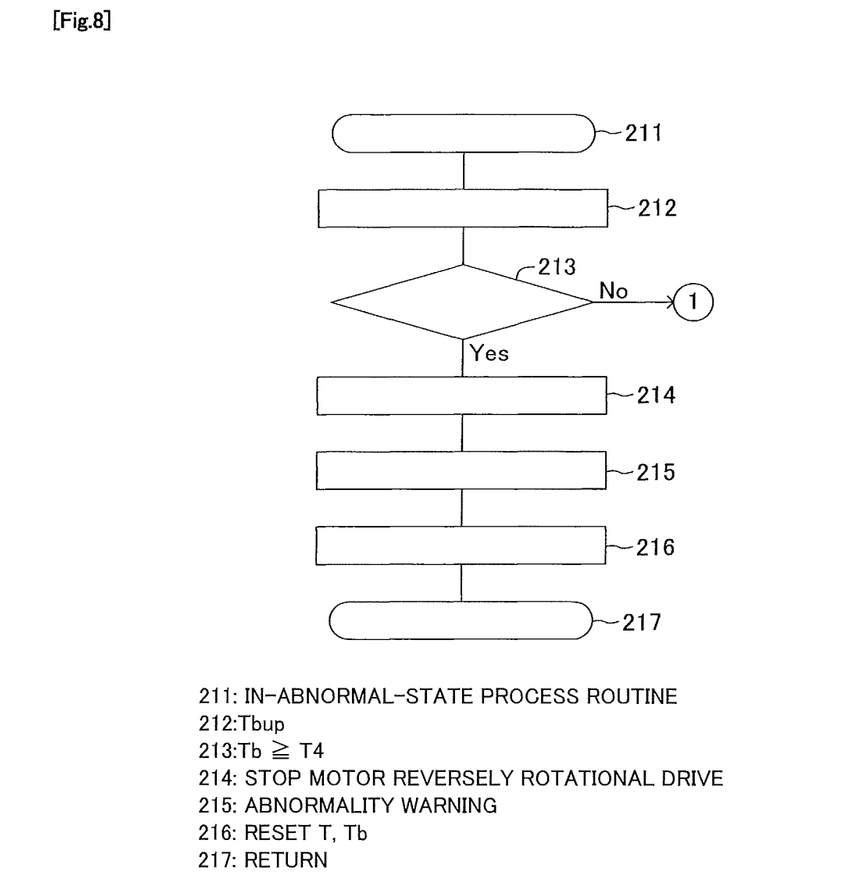
FIG. 8 is a flow chart showing a sub-routine executed in an in-abnormal-state process shown in FIG. 7.

When the motor control unit (electric control device) ECU executes the in-abnormal-state process in step 210 in FIG. 7, an in-abnormal-state process routine in FIG. 8 is executed. In the in-abnormal-state process routine in FIG. 8, the process is started in step 211, and an abnormal condition establishment duration Tb is counted up (Tbup) in step 212. In step 213, it is determined whether the abnormal condition establishment duration Tb is a predetermined value T4 or more. The predetermined value T4 is to determine a stop timing of the electric motor 21 (see T4 in FIG. 10), and is arbitrarily set. Until the abnormal condition establishment duration Tb reaches the predetermined value T4, "No" is determined in step 213, and step 205 in FIG. 7 and steps 211 to 213 in FIG. 8 are repeatedly executed.

When the abnormal condition establishment duration Tb reaches the predetermined value T4, "Yes" is determined in step 213, and steps 214 to 217 are executed. The electric motor 21 is stopped in step 214, an alarm for abnormality is generated in step 215, and the elapsed time T and the abnormal condition establishment duration Tb are reset in step 215. In step 217, the return process is performed to end the program in step 99 in FIG. 5.

Figure 10:
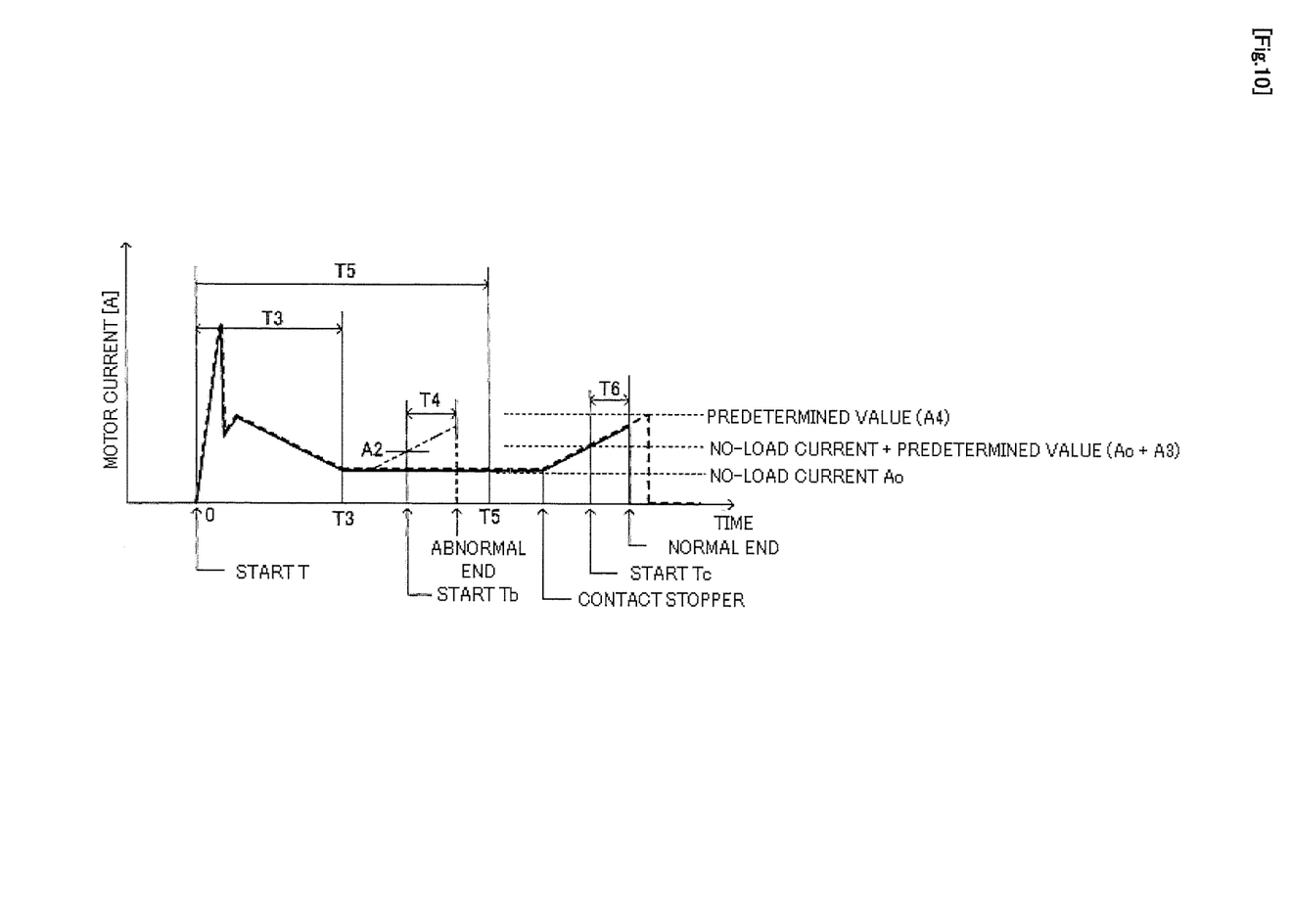
FIG. 10 is a graph showing a relationship between a time (time in which the electric motor reversely rotates) in which the sub-routines shown in FIG. 7, FIG. 8, and FIG. 9 are executed and a motor current (current supplied to the electric motor).

In a period in which the elapsed time T falls within the range of the predetermined value T3 to a set value T5, when the current value A supplied to the electric motor 21 does not increase not to reach the abnormality determination current value A2 (more specifically, as indicated by a solid line or a broken line in FIG. 10, when the electric motor 21 normally operates), steps 205 to 208 in FIG. 7 are repeatedly executed. "No" is determined in step 205, the elapsed time T is counted up in step 206, the abnormal condition establishment duration Tb is reset in step 207, and "No" is determined in step 208. The set value T5 is set on the basis of a time required when the parking lever 17 moves from the operating position to the return position by normal reversely rotational drive of the electric motor 21.

Figure 9:
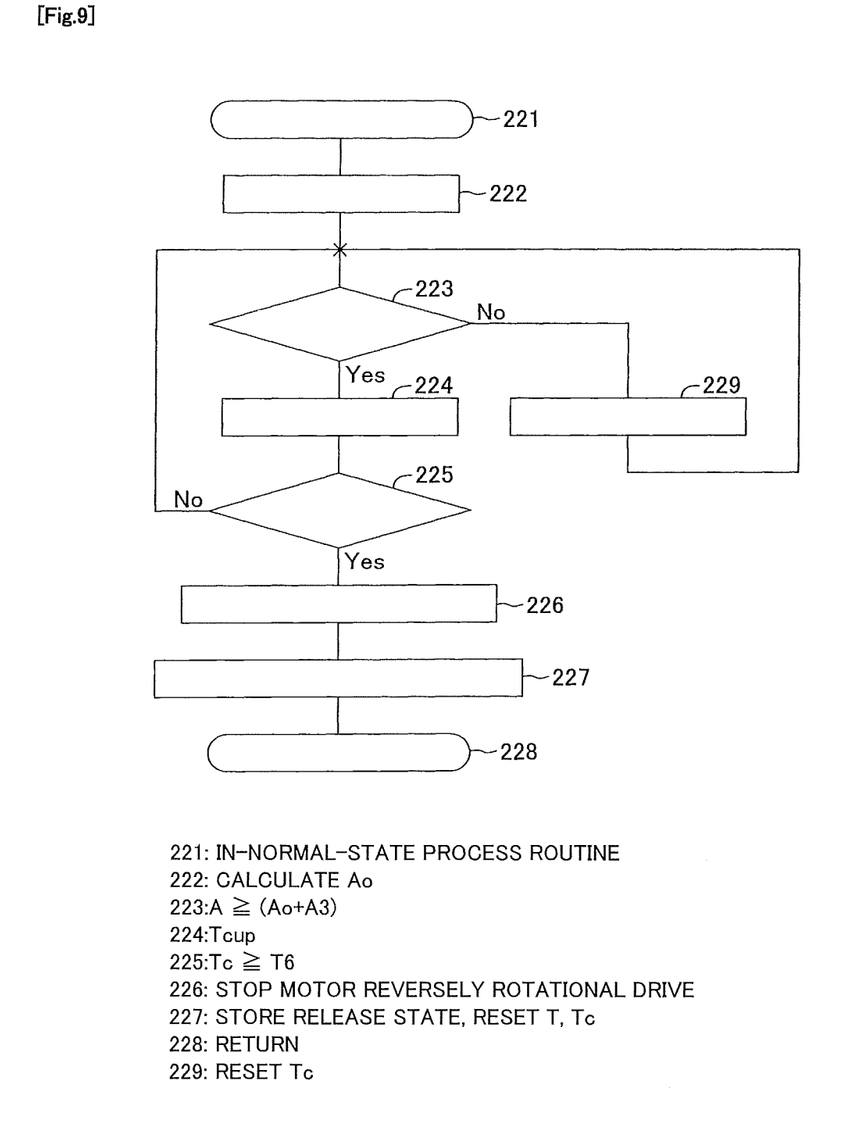
FIG. 9 is a flow chart showing a sub-routine executed in an in-normal-state process shown in FIG. 7.

In this manner, when the elapsed time T reaches the set value T5, "Yes" is determined in step 208 in FIG. 7, and an in-normal-state process is executed in step 220. When the motor control unit (electric control device) ECU executes the in-normal-state process in step 220 in FIG. 7, an in-normal-state process routine in FIG. 9 is executed. In the in-normal-state process routine in FIG. 9, the process is started in step 221, a no-load current value Ao is calculated in step 222, and it is determined in step 223 whether the current value A supplied to the electric motor 21 is a load determination current value (Ao+A3) or more. The no-load current value Ao is a current value supplied to the electric motor 21 before the first coupling pin 29a is brought into contact with the stopper 27 by the reversely rotational drive of the electric motor 21 (more specifically, in a no-load state set until the first coupling pin 29a contacts with the stopper 27 after the elapsed time T becomes the set value T5). A predetermined value A3 corresponds to a current value increasing depending on an increase in load obtained by the load applying mechanism (the stopper 27 and the disk spring assembly 28), and is arbitrarily set. Until the current value A reaches the load determination current value (Ao+A3), "No" is determined in step 223, and steps 223 to 229 in FIG. 9 are repeatedly executed. In step 229, a load condition establishment duration Tc is reset.

Until the current value A reaches the load determination current value (Ao+A3), "Yes" is determined in step 223, and steps 224 to 225 are executed. The load condition establishment duration Tc is counted up in step 224 (Tcup), and it is determined in step 225 whether the load condition establishment duration Tc is a predetermined value T6 or more. The predetermined value T6 is to determine a stop timing of the electric motor 21 (see T6 in FIG. 10), and is arbitrarily set. Until the load condition establishment duration Tc reaches the predetermined value T6, "No" is determined in step 225, and steps 223 to 225 are repeatedly executed.

When the load condition establishment duration Tc reaches the predetermined value T6, "Yes" is determined in step 225, steps 226 to 228 are executed. The reversely rotational drive of the electric motor 21 is stopped in step 226, the release state is stored and the elapsed time T and the load condition establishment duration Tc are reset in step 227, and the return process is performed in step 228 to end the program in step 99 in FIG. 5.

In the embodiment described above, although the determination is made by setting the durations Ta, Tb, and Tc to avoid an erroneous determination caused by signal noise or the like, the determination can also be made without setting the durations Ta, Tb, and Tc (executed such that, after T becomes T1, the forward rotational drive of the electric motor 21 is stopped when A reaches A1, the reversely rotational drive of the electric motor 21 is stopped when T is T3 to T5 and A reaches A2, and the reversely rotational drive of the electric motor 21 is stopped after T becomes T5 and when A reaches (Ao+A4)).

As described above, in short, in the embodiment, in the electric parking brake device according to the present invention, the operation/stop of the electric motor 21 can be advantageously controlled by a current value A supplied to the electric motor 21 (a sensor for electrically detecting the state of the parking lever 17 is advantageously unnecessary), and the motor control unit (electric control device) ECU can be simply configured at low costs. Since the motor control unit (electric control device) ECU includes the calculation unit (steps 222 and 223) and the reversely rotational drive stop unit (steps 223 to 226) and is configured to stop the reversely rotational drive of the electric motor 21 when it is determined that the rotational load determination value (current value A) is the reference value (Ao+A3) or more the set time after the reversely rotational drive of the electric motor 21 is started (T=0) (T≥T5), the reversely rotational drive of the electric motor 21 can be accurately stopped, and a rotational load required for the load applying mechanism (the stopper 27 and the disk spring assembly 28) can be set to be small. As a result, the load applying mechanism (the stopper 27 and the disk spring assembly 28) can be miniaturized and manufactured at low costs.

In the embodiment, the sum (Ao+A3) of the no-load current value Ao and the preset predetermined current value A3 is defined as a reference value for reversely rotational drive stop determination of the electric motor 21, and the no-load current value Ao serves as a part of the reference value. For this reason, a fluctuation in performance caused by a manufacturing error or the like in the conversion mechanism 22 or the load applying mechanism (the stopper 27 and the disk spring assembly 28) can be excluded. Thus, determination accuracy when the reversely rotational drive of the electric motor 21 is stopped can be improved, and a rotational load required by the load applying mechanism (the stopper 27 and the disk spring assembly 28) can be reduced. As a result, the load applying mechanism (the stopper 27 and the disk spring assembly 28) can be miniaturized and manufactured at low costs.

In the embodiment, when it is determined that the rotational load determination value (current value A) is the reference value (A2) or more within the set time (time zone from T3 to T5) except for an operation initial time zone (time zone from 0 to T3) in which a current is unstable from the start of the reversely rotational drive (T=0) of the electric motor 21, the abnormal-state reversely rotational drive stop unit (step 214) for stopping the reversely rotational drive of the electric motor 21 and the abnormality notification unit (step 215) for notifying of abnormality are included in the motor control unit (electric control device) ECU. For this reason, abnormality in the electric actuator 20 in the device is detected to make it possible to stop an abnormal operation and to notify of the abnormal operation.

In the embodiment, the program is executed such that the sum (Ao+A3) of the no-load current value Ao and the preset predetermined current value A3 is defined as the reference value for determining a timing of stopping the reversely rotational drive of the electric motor 21 and the current value A supplied to the electric motor 21 is defined as the rotational load determination value. However, in execution of the present invention, a differential value of the current value A supplied to the electric motor 21 may be employed as the rotational load determination value. In this case, the stop timing can be determined rapidly more than that in the embodiment, determination accuracy at which the reversely rotational drive of the electric motor 21 is stopped can be improved, and the load applying mechanism can be further miniaturized and manufactured at low costs.

In the embodiment, the determination is made such that the sum (Ao+A3) of the no-load current value Ao and the preset predetermined current value A3 is defined as the reference value for determining a timing of stopping the reversely rotational drive of the electric motor 21 and the current value A supplied to the electric motor 21 is defined as the rotational load determination value. However, in execution of the present invention, the determination can also be made such that the set value A4 (see FIG. 10) larger than (Ao+A3) is employed as the reference value.

In the embodiment, an abnormality determination is made by the current value A supplied to the electric motor 21. However, for example, the abnormality determination can also be made by a differential value of the current value A supplied to the electric motor 21, and various changes can be effected without departing from the contents described in the scope of claims.

The invention claimed is:

1. An electric parking brake device configured such that a parking lever in a drum brake is driven from a return position to an operating position by forward drive of an electric actuator to drive a brake shoe from a return position to an operating position and the parking lever is driven from the operating position to the return position by reverse drive of the electric actuator to drive the brake shoe from the operating position to the return position, wherein the electric actuator includes:
an electric motor which can be rotationally driven forward/reversely and the operation of which can be controlled by a motor control unit depending on a rotational load;
a conversion mechanism which can convert rotational motion into linear motion, can move the parking lever from the return position to the operating position in a forward drive state in which the electric motor rotates forward, and can move the parking lever from the operating position to the return position in a reverse drive state in which the electric motor reversely rotates; and
a load applying mechanism drives a constituent member of the conversion mechanism after the parking lever moves from the operating position to the return position by reverse rotation of the electric motor to apply a rotational load increasing depending on a drive amount of the constituent member to the electric motor, and wherein the motor control unit includes a calculation unit which calculates a rotational load determination value to determine whether the rotational load applied to the electric motor by the load applying mechanism when the electric motor reversely rotationally drives is a set value or more on the basis of a current supplied to the electric motor, and a reversely rotational drive stop unit which stops the reversely rotational drive of the electric motor when the rotational load determination value is a reference value or more a set time after the reversely rotational drive of the electric motor is started, and the rotational load determination value is a current value supplied to the electric motor, and a sum of a no-load current value detected in a reversely rotational drive state of the electric motor and a preset predetermined current value is defined as the reference value.

2. The electric parking brake device according to claim 1, wherein the motor control unit includes an abnormal-state reversely rotational drive stop unit which stops the reversely rotational drive of the electric motor when it is determined that the rotational load determination value is the reference value or more within the set time except for an operation initial time zone in which a current supplied to the electric motor is unstable from the start of the reversely rotational drive of the electric motor, and an abnormality notification unit which notifies of abnormality.

3. An electric parking brake device configured such that a parking lever in a drum brake is driven from a return position to an operating position by forward drive of an electric actuator to drive a brake shoe from a return position to an operating position and the parking lever is driven from the operating position to the return position by reverse drive of the electric actuator to drive the brake shoe from the operating position to the return position, wherein the electric actuator includes:
an electric motor which can be rotationally driven forward/reversely and the operation of which can be controlled by a motor control unit depending on a rotational load;
a conversion mechanism which can convert rotational motion into linear motion, can move the parking lever from the return position to the operating position in a forward drive state in which the electric motor rotates forward, and can move the parking lever from the operating position to the return position in a reverse drive state in which the electric motor reversely rotates; and
a load applying mechanism drives a constituent member of the conversion mechanism after the parking lever moves from the operating position to the return position by reverse rotation of the electric motor to apply a rotational load increasing depending on a drive amount of the constituent member to the electric motor, and wherein
the motor control unit includes a calculation unit which calculates a rotational load determination value to determine whether the rotational load applied to the electric motor by the load applying mechanism when the electric motor reversely rotationally drives is a set value or more on the basis of a current supplied to the electric motor, and a reversely rotational drive stop unit which stops the reversely rotational drive of the electric motor when the rotational load determination value is a reference value or more a set time after the reversely rotational drive of the electric motor is started, and
the rotational load determination value is a differential value of a current value supplied to the electric motor, and a preset predetermined value is defined as the reference value.

4. The electric parking brake device according to claim 3, wherein the motor control unit includes an abnormal-state reversely rotational drive stop unit which stops the reversely rotational drive of the electric motor when it is determined that the rotational load determination value is the reference value or more within the set time except for an operation initial time zone in which a current supplied to the electric motor is unstable from the start of the reversely rotational drive of the electric motor, and an abnormality notification unit which notifies of abnormality.

5. An electric parking brake device configured such that a parking lever in a drum brake is driven from a return position to an operating position by forward drive of an electric actuator to drive a brake shoe from a return position to an operating position and the parking lever is driven from the operating position to the return position by reverse drive of the electric actuator to drive the brake shoe from the operating position to the return position, wherein the electric actuator includes:
an electric motor which can be rotationally driven forward/reversely and the operation of which can be controlled by a motor control unit depending on a rotational load;
a conversion mechanism which can convert rotational motion into linear motion, can move the parking lever from the return position to the operating position in a forward drive state in which the electric motor rotates forward, and can move the parking lever from the operating position to the return position in a reverse drive state in which the electric motor reversely rotates; and
a load applying mechanism drives a constituent member of the conversion mechanism after the parking lever moves from the operating position to the return position by reverse rotation of the electric motor to apply a rotational load increasing depending on a drive amount of the constituent member to the electric motor, and wherein
the motor control unit includes a calculation unit which calculates a rotational load determination value to determine whether the rotational load applied to the electric motor by the load applying mechanism when the electric motor reversely rotationally drives is a set value or more on the basis of a current supplied to the electric motor, and a reversely rotational drive stop unit which stops the reversely rotational drive of the electric motor when the rotational load determination value is a reference value or more a set time after the reversely rotational drive of the electric motor is started, and
the motor control unit includes an abnormal-state reversely rotational drive stop unit which stops the reversely rotational drive of the electric motor when it is determined that the rotational load determination value is the reference value or more within the set time except for an operation initial time zone in which a current supplied to the electric motor is unstable from the start of the reversely rotational drive of the electric motor, and an abnormality notification unit which notifies of abnormality.

* * * * *